United States Patent
Mejia et al.

(10) Patent No.: US 7,460,462 B2
(45) Date of Patent: Dec. 2, 2008

(54) CONTACT PROBE STORAGE FET SENSOR AND WRITE HEATER ARRANGEMENTS

(75) Inventors: Robert G. Mejia, Boise, ID (US); Richard Lee Hilton, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 686 days.

(21) Appl. No.: 10/736,600

(22) Filed: Dec. 17, 2003

(65) Prior Publication Data

US 2005/0135199 A1 Jun. 23, 2005

(51) Int. Cl.
*G11B 11/00* (2006.01)
(52) U.S. Cl. ...................................... 369/126
(58) Field of Classification Search ........................ None
See application file for complete search history.

(56) References Cited

U.S. PATENT DOCUMENTS

| | | | |
|---|---|---|---|
| 3,920,930 A | 11/1975 | Sobczyk | |
| 5,323,377 A | 6/1994 | Chen et al. | |
| 5,729,026 A * | 3/1998 | Mamin et al. | ............ 250/492.2 |
| 5,835,477 A | 11/1998 | Binnig et al. | |
| 6,079,255 A | 6/2000 | Binnig et al. | |
| 6,101,164 A | 8/2000 | Kado et al. | |
| 6,291,140 B1 | 9/2001 | Andreoli et al. | |
| 6,304,527 B1 | 10/2001 | Ito et al. | |
| 6,477,132 B1 | 11/2002 | Azuma et al. | |
| 6,515,277 B1 | 2/2003 | Kley | |
| 6,518,570 B1 | 2/2003 | Hough et al. | |
| 6,583,411 B1 | 6/2003 | Altmann et al. | |
| 7,054,257 B2 * | 5/2006 | Binnig et al. | ................ 369/126 |
| 2001/0019461 A1 | 9/2001 | Allenspach et al. | |
| 2002/0008304 A1 | 1/2002 | Lim et al. | |
| 2002/0066855 A1 | 6/2002 | Choi et al. | |

FOREIGN PATENT DOCUMENTS

| | | |
|---|---|---|
| WO | WO 02/37488 | 5/2002 |
| WO | WO 03/042627 | 5/2003 |

OTHER PUBLICATIONS

E. Thielicke et al., "Microactuators and Their Technologies", Dec. 17, 2003.

* cited by examiner

*Primary Examiner*—Joseph Feild
*Assistant Examiner*—Joseph Haley

(57) ABSTRACT

A read/write arrangement for a contact probe storage arrangement or the like, has a cantilever disposed with a medium which is movable relative to the cantilever; a device associated with one of the cantilever and the medium which is configured to be responsive to changes in electrical field between the medium and the cantilever caused by a change in distance between the medium and the cantilever; a heater disposed on the cantilever for heating the medium and for inducing localized topographical changes which represent bits of data; and a circuit which electrically interconnects both of the device and the heater.

12 Claims, 7 Drawing Sheets

CONTACT PROBE STORAGE FET SENSOR AND WRITE HEATER ARRANGEMENTS

BACKGROUND OF THE INVENTION

The present invention relates to a read/write arrangement for Contact Probe Storage (CPS) arrangements and the like, wherein a heater is used to heat a medium and modify its topography so that data bits are written thereinto, and wherein a read sensor arrangement, which is based on a FET (Field Effect Transistor), responds to changes in distance from a substrate that supports the medium and emits an electric field, induced by the modified topography.

It has been hitherto been proposed to sense data which is written onto a movable medium using a probe that is supported on a cantilever and used to contact movable the medium. A heated element (heater) is provided in the cantilever proximate the probe. The heater is heated by passing a current of electricity therethrough. By using heat transfer characteristics between the movable medium and the probe (or a portion of the cantilever in which the heating element is formed), it is possible to determine minute changes in distance between the movable medium and the cantilever on which the probe is carried, and to use this as a means for reading out the data stored on the movable medium.

The heater in the cantilever can be used for both reading and writing. The reading function uses a thermal readback sensor arrangement which exploits a temperature-dependent resistance function. In this arrangement, the resistance (R) increases nonlinearly with heating power/temperature from room temperature to a peak value of 500-700° C. (writing). The peak temperature is determined by the doping concentration in the heater platform, which ranges from $1 \times 10^{17}$ to $2 \times 10^{18}$. Above the peak temperature, the resistance drops as the number of intrinsic carriers increases because of thermal excitation.

During sensing, the resistor is operated at about 200° C. This temperature is not high enough to soften the polymer medium, as is necessary for writing, but allows molecular energy transfer between the cantilever on which the probe is carried, and the moving medium, to remove heat and thus provide a parameter which allows the distance between the cantilever on which the probe is carried and the medium on which the probe is running to be measured.

That is to say, this thermal sensing is based on the fact that the thermal conductance between the heater platform and the storage substrate changes according to the distance between them. The medium between a cantilever and the storage substrate, in this case air, transports heat from one side the heater/cantilever to the other of storage media/substrate. When the distance between heater and media is reduced as the probe moves into a bit indentation, heat is more efficiently transported through the air and the heater's temperature and hence its resistance decreases. Thus, changes in temperature of the continuously heated resistor are monitored while the cantilever is scanned over data bits, providing a means of detecting the bits.

Under typical operating conditions, the sensitivity of the thermomechanical sensing is even better than that of piezoresistive-strain sensing inasmuch as thermal effects in semiconductors are stronger than strain effects. A $\Delta R/R$ sensitivity of about $10^{-4}$ /nm is demonstrated by the images of the 40-nm-size bit indentations. This is better than the results are obtained using the piezoresistive-strain technique.

Nevertheless, the thermal response has been found to be slower than desired and is significantly slower than the cantilever's ability to mechanically follow the data pattern written in the medium. This leads to the system's read performance being slower than it would be if it were not limited to the thermal response of the sensing system.

DETAILED DESCRIPTION OF THE EXEMPLARY EMBODIMENTS

Figure 1:
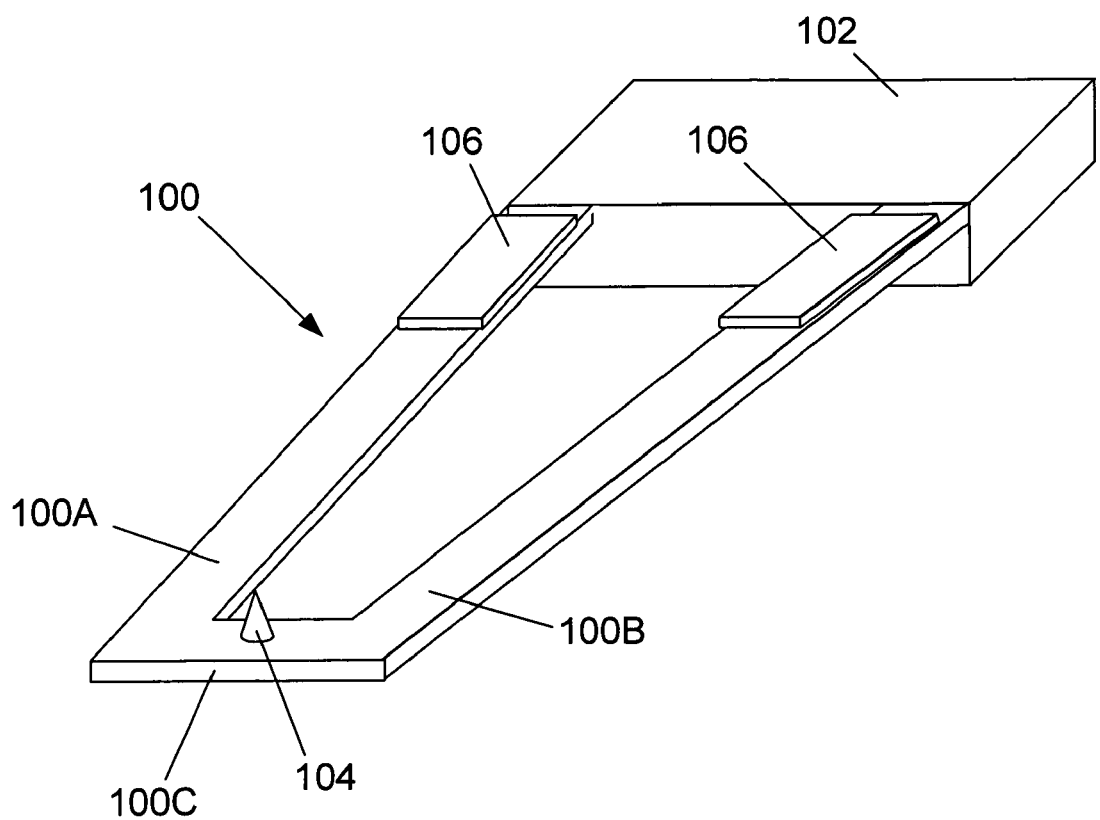
FIG. 1 is a schematic perspective view of a cantilever (media facing side up) which has a probe and to which embodiments of the invention are applicable.
Figure 2A:
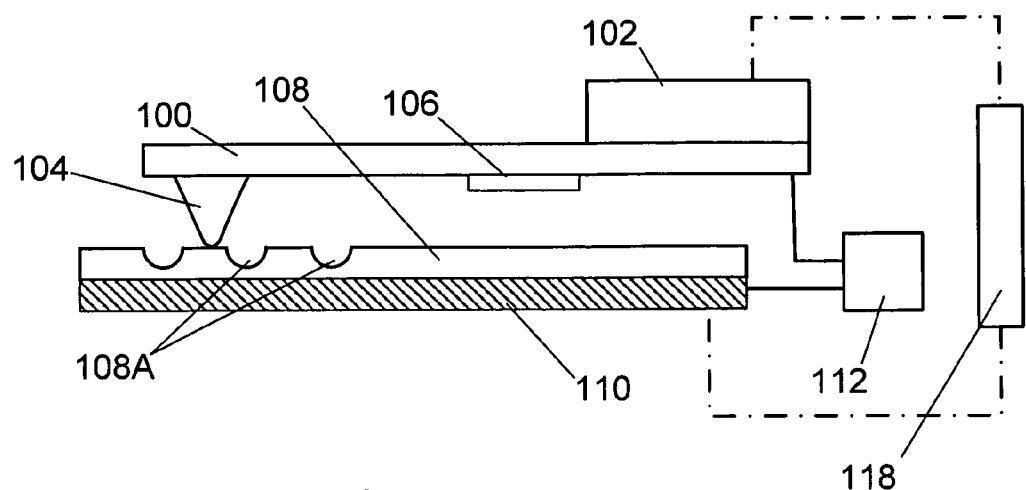
FIGS. 2A and 2B are respectively schematic side views showing the cantilever disposed with a medium in which data bits have been written by a heater which is incorporated into the embodiments of the invention, and the change in distance which is induced when a probe on the cantilever engages a flat surface of the substrate/enters or locates a data indicative topographical change.
Figure 2B:
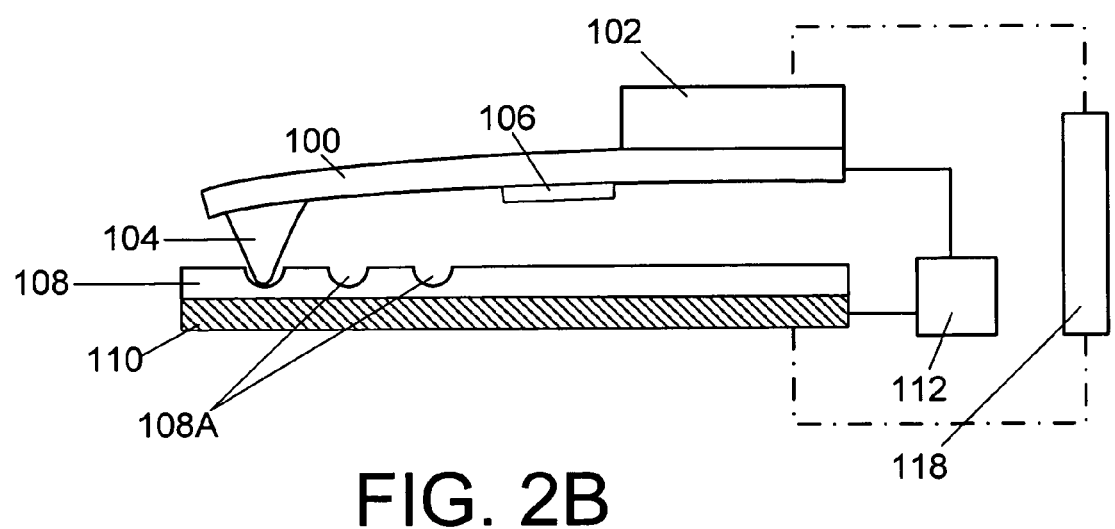

FIGS. 1, 2A and 2B show a cantilever arrangement of the type to which the embodiments of the invention can be applied. The cantilever 100 is supported at its inboard end on a base member 102 and is formed at its outboard end with a probe 104. In the illustrated arrangement, the cantilever 100 comprises two arms 100A, 100B the outboard ends of which are interconnected by an end bridge member 100C.

The probe 104 is formed on the end bridge member 100C. The probe 104 is formed using suitable masking and etching or the like type of fabrication technique can be formed so as to be at least in part electrically non-conductive.

Layers of activation material 106 are disposed on the arms of the cantilever 100 to control the flexure of the cantilever toward a medium 108 which is movable with respect to the cantilever 100 or vice versa. The activation material 106, however, is not limited to the use of intrinsically stressed material and can be alternatively formed of a piezoelectric material if so desired.

The medium 108 is comprised of a layer of heat deformable material such as polycarbonate or polymethylmethacrylate (PMMA) for example, which is formed over the surface of a suitable support substrate. The medium 108, which in this case is non-conductive, can be heated locally to write data by fusing and changing the medium topography to the degree that the changes can be detected using the probe 104 in the manner depicted in FIGS. 2A and 2B. The medium 108 is supported on a substrate 110 which in this instance is electrically conductive and is electrically connected to a sensor circuit 112 which is adapted to apply a bias to the substrate 110 and produce an electric field which can be used to gate a FET.

Although the topography is shown as comprising a series of data recesses or pits 108A, these can be replaced with humps (not shown) or a combination of pits and humps. It should be noted that the formation of pits may also form associated bumps in the process. Bumps will typically be formed as the regions where no pits are present.

Thus, when the medium 108 or the cantilever 100 has been moved relative to the other to assume an exact coordinate relationship, the cantilever can be moved toward the medium. In the event that a pit 108A (or isolated hump) is located under the probe 104 in the manner schematically depicted in FIG. 2A, the entry of the probe 104 into the pit (or engagement with the top of the hump) indicates the presence of a data bit. Should the probe 104 not find a pit or a hump and seat on the flat surface of the medium such as depicted in FIG. 2A then an absence of a data bit is indicated.

Additionally, the bits may be coded such that a particular change from one state (pit, hump or flat surface) to another state would indicate a bit and other states or changes would indicate the lack of a bit. The invention can use other coding techniques employed in contact storage device detection patterns or other responses that are predominant in the response of the sensor-media systems.

The topography of the medium 108 is thus such that the distance or gap between the medium 108 and a cantilever 100 on which the probe 104 is formed, varies. This distance variation allows a FET (field effect transistor) which is formed in the cantilever 100 proximate the probe 104 and which is generally denoted by the numeral 114 in this embodiment of the invention, to respond to changes in the electric field which is generated between the substrate 110 and the cantilever 100 and thus modulate a signal in the form of a current which passes through the FET 114 in accordance with the amount of clearance between the medium 108 and the cantilever 100.

The sensor circuit 112 is also arranged to be responsive to the change in current passing through the FET 114 and thus detect the change in distance between the cantilever 100 and the substrate 110. In the embodiments of the invention, a heater 116 is circuited with the FET 114 and is arranged to be supplied power via conductive traces or lines which are formed in the cantilever 100 such as by doping (ion implantation or the like) and which are common to both the heater 116 and the FET 114.

Figure 3:
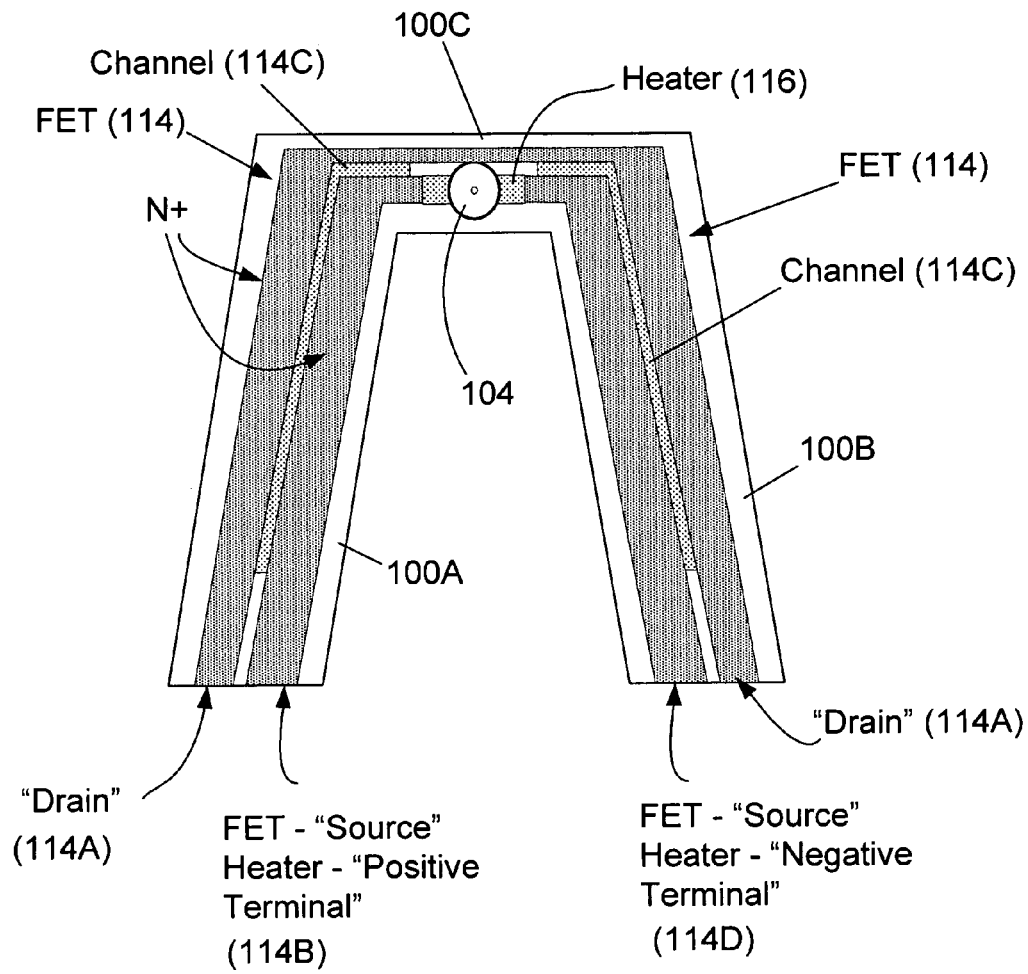
FIG. 3 is a schematic probe-side plan view of the cantilever showing a heater/FET arrangement according to a first embodiment of the invention

A first embodiment of the invention is schematically illustrated in FIG. 3. It should be noted however, that the portion of the cantilever 100 which is depicted in FIGS. 3-6, is merely an end portion of the cantilever 100 that is able to move toward and away from the medium 108. As shown, the heater 116 is formed as an electrically conductive region having a suitable resistance, in a portion of the cantilever 100 which is located immediately proximate the probe 104.

The resistance of the heater 116 can be controlled by controlling the doping concentration with respect to that of the traces on either side which are more heavily doped and thus more conductive. As will be appreciated, the probe 104 itself can form part of the heater to facilitate localized heating and fusing of the medium 108.

The cantilever 100, in this embodiment, is formed of silicon which has been masked, etched and doped in a known manner to produce the illustrated configuration and electrically conductive lines or traces 114A, 114B, 114C and 114D. These traces define the source, drain and channel of the FET 114 as well as the circuit via which the heater 116 is operated.

In addition to writing, the heater 116 can also be used to heat and induce softening and reflow of localized areas of the medium to smooth out and erase a data indicative recess or hump. Needless to say, the heater must be maintained in proximity to this portion of the medium but with the probe 104 out of contact therewith.

The change in distance between the portion of the cantilever 100 in which the FET 114 is formed and the medium which occurs in the manner depicted in FIGS. 2A and 2B, is sufficient to change the electrical field strength in the channel region of the FET. This induces the situation wherein the change in proximity of the cantilever 100 to the substrate 108 varies the gating of the FET 114 and modulates the current which is permitted to flow from the drain 114A to the source 114B and 114D through the channel 114C which is interposed between the two.

The FET 114 is formed only long the lower portions of the cantilever 100 and is formed only in the portions of the cantilever 100 that actually move in response to the probe encountering a topographical change. The formation of the FET 114 on the lower surface of the cantilever facilitates production, provides a greater W/L ratio, and a greater sensor area and gain. The formation of the FET 114 on portions of the cantilever which do not undergo much movement are avoided to avoid contribution to DC current and noise.

Since the probe 104 moves over/contacts an electrically non-conductive medium 108, the modulation of the current passing through the FET 114 is due solely to the changes in the electrical field which are produced between the cantilever 100 and the substrate 110 which of course must be sufficiently conductive to allow for the required electrical field to be established.

During the read mode of operation, trace 114A, which extends continuously along both legs 100A, 100B and across the end bridge 100C, acts as a common drain while traces 114B and 114D act as sources for what is essentially two halves of the FET. Features 114C, is in this embodiment, form channels which separate the drains and sources of the FET arrangement.

The bias applied to the substrate 110 gates the FET allowing current to pass through the two channel portions 114C which are formed. Current flow between the common drain and the two source halves is used to derive a read signal. Since traces 114B and 114D are both used as "sources" during this time, no current flow through the heater 116 occurs.

During the heating/write mode of operation, the bias to the substrate 110 is lowered to the point where gating of the FET does not occur. At this time the roles of traces 114B and 114D are changed so that one acts as positive terminal for the heater 116 while the other acts as the negative terminal. Electrical current therefore induced to passed through the heater 116.

The switching arrangement which allows this change between read and write modes of operation is well within the purview of the person of skill in the art of electrical controls and thus no further discussion will be given for the sake of brevity.

The FET 114 shown in FIG. 3 is a depletion mode N-channel type FET. However, the embodiment is not limited to this type of FET and may be replaced with a P-channel type if desired. In depletion mode FETs, the channel is formed by doping in the channel region. The FET will conduct in varying amounts as modulated by the gate voltage. If the gate voltage is made negative enough, the carriers will be driven from the channel causing the FET to cease to conduct.

As shown in FIGS. 2A and 2B the medium 108 and the cantilever 100 are operatively (mechanically) interconnected so that medium 108 is selectively movable with respect to the cantilever 100 by way of a drive mechanism denoted by element 118 (schematically depicted in FIG. 2). This mechanism is arranged to move the two elements (viz., the cantilever 100 and the medium 108) with respect to one another so as to assume a selected coordinate relationship and position the probe 104 so that it can detect if a data indicative change in topography (e.g. a pit 108A ) is present or absent at that set of coordinates.

With this embodiment, a good sensor bandwidth can be expected inasmuch as the electric field responds as fast as the cantilever can move. The FET is thus able to respond quickly to the variations in field strength and has the potential to make the mechanics of the cantilever the limiting factor in the bandwidth. The signal to noise ratio (SNR) for this arrangement can be expected to be improve as compared to the above-mentioned thermal type sensor in that, with the latter, much of the useful signal is filtered out by the thermal low-pass function.

Since the FET is capable of producing gain, the sensing aspect of the embodiments can be expected to produces a relatively large output signal with respect to the various noise sources and thus reduce signal degradation due to these noises.

While the embodiment of FIG. 3 has been disclosed as being including a depletion mode FET, it is possible, in this and the other embodiments of the invention, to use an induced-channel type FET. This induced-channel or enhancement mode FET is such that there is no intrinsic channel and the drain to source conductance is very low until the gate voltage is applied. When the gate voltage exceeds a given threshold, enough carriers are pulled into the channel region that the device starts to conduct. In an N-channel enhancement type FET, the channel is p-type material that forms a conduction band when sufficiently positive gate voltage is applied. When conducting, the channel behaves like n-type material.

Figure 4:
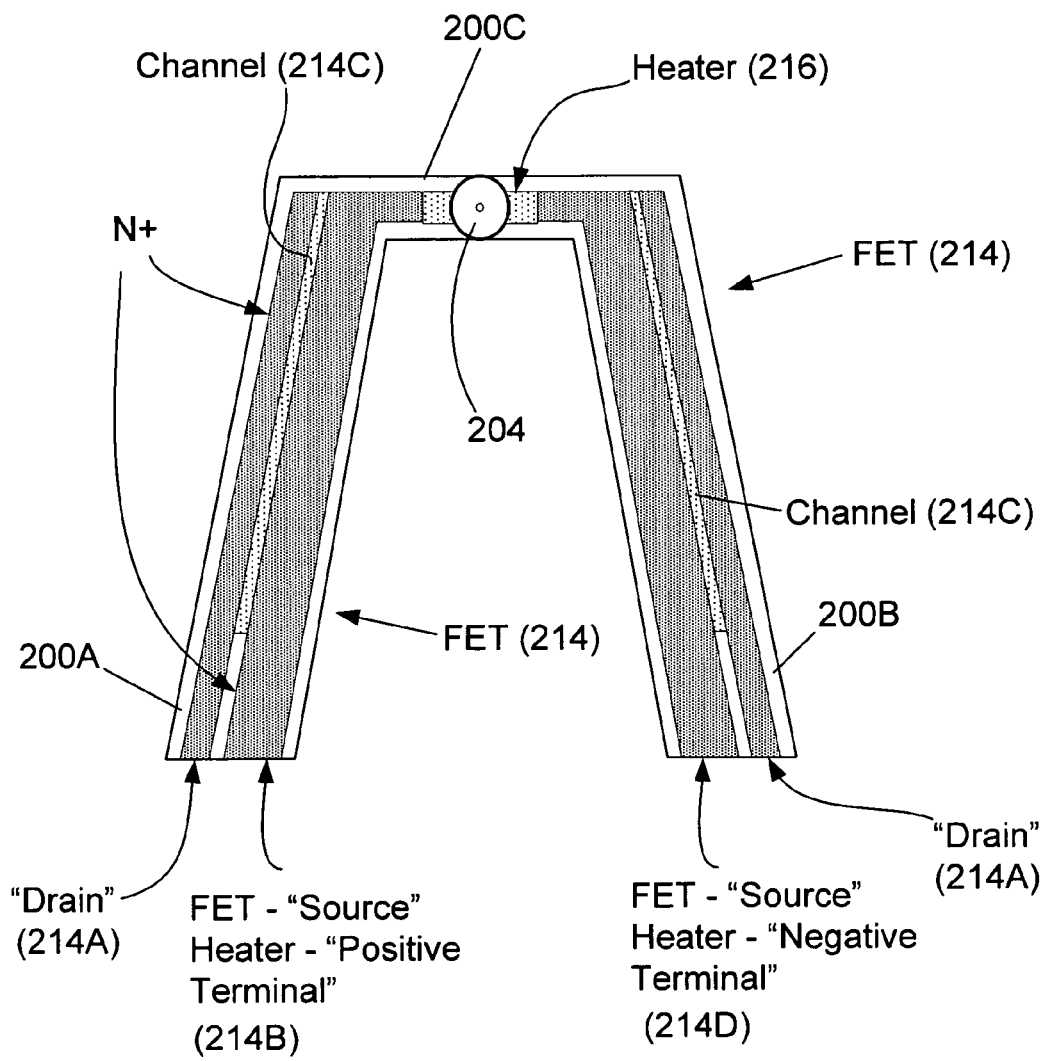
FIG. 4 is an schematic underside plan view of the cantilever showing a heater/FET arrangement according to a second embodiment of the invention

FIG. 4 shows a second embodiment of the invention. In this embodiment the doped traces which form left and right hand side portions of the FET 214 are simplified. This configuration allows the end bridge 200C of the cantilever 200 to be narrowed and to add a minimum of thermal mass to the area of the cantilever 200 proximate the probe 204. It also limits the thermal conductivity out into the legs of the cantilever.

With the heater 216 interposed in the illustrated manner, the outboard traces both act as drains for the FET 214 while the inboard traces act as sources during the read mode and are switched in the same manner as disclosed in connection with the first embodiment shown in FIG. 3.

Figure 5:
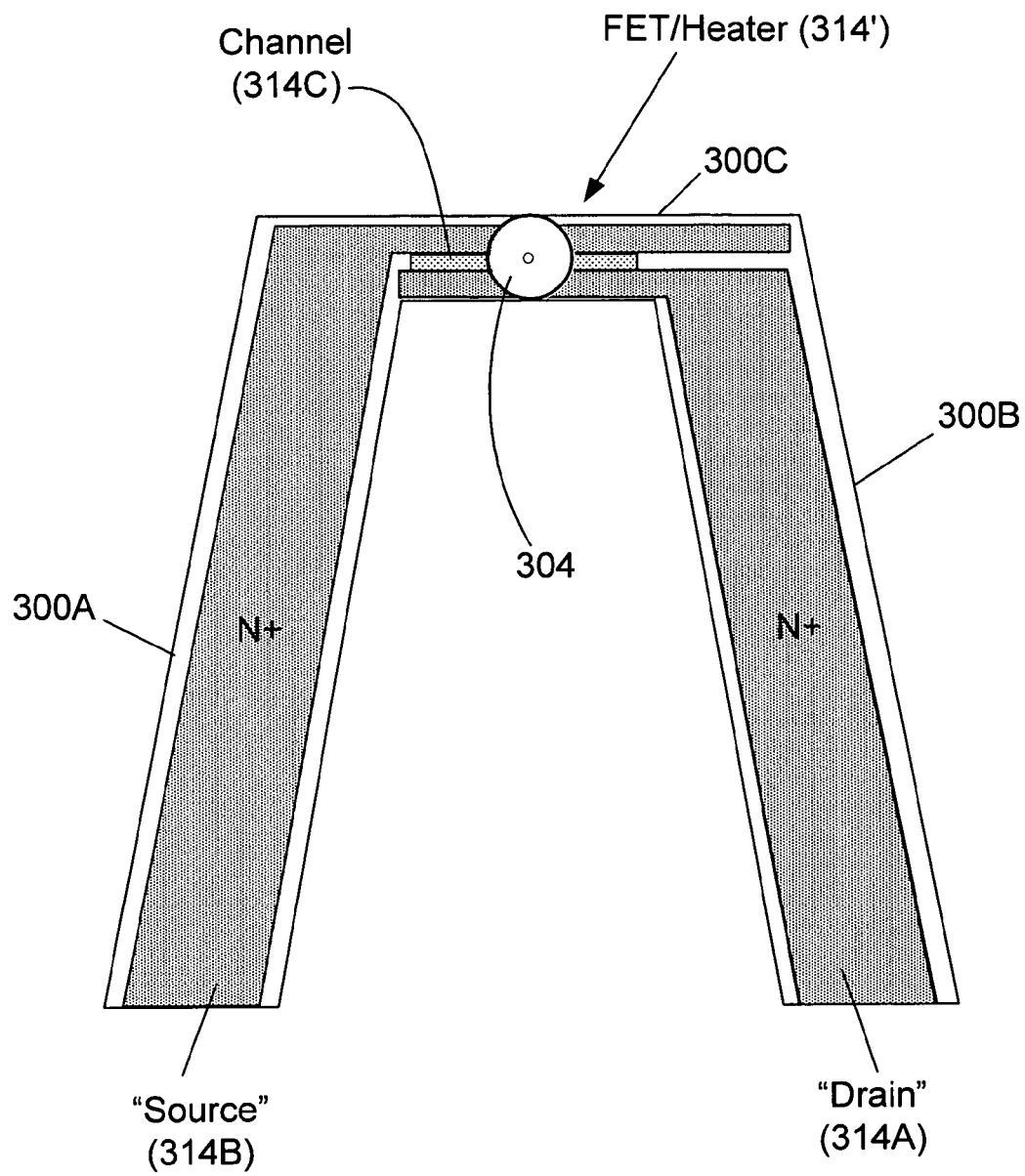
FIG. 5 is an schematic underside plan view of the cantilever showing a heater/FET arrangement according to a third embodiment of the invention

FIG. 5 shows a third embodiment of the invention. In this embodiment the FET 314' also acts as the heater during the heating mode and is such that the geometry of the FET elements maximizes the width of the FET in the vicinity of the probe 104. This embodiment accordingly has only one source 314B and one drain 314A.

The switching between the reading and writing mode is achieved one by operating the source and drain at voltages such that the FET was turned on partially. This places the channel in a state of medium conductivity where there would be a lot of voltage drop across it. Assuming that the substrate potential was fixed, the source voltage could be set to a value to establish the "on resistance" of the FET and the drain could be set to a voltage to cause the desired amount of power to be dissipated.

With this technique however, the power density in the channel may tend to be too high and the control of the FET may require accurately controlled voltages and the like.

Figure 6:
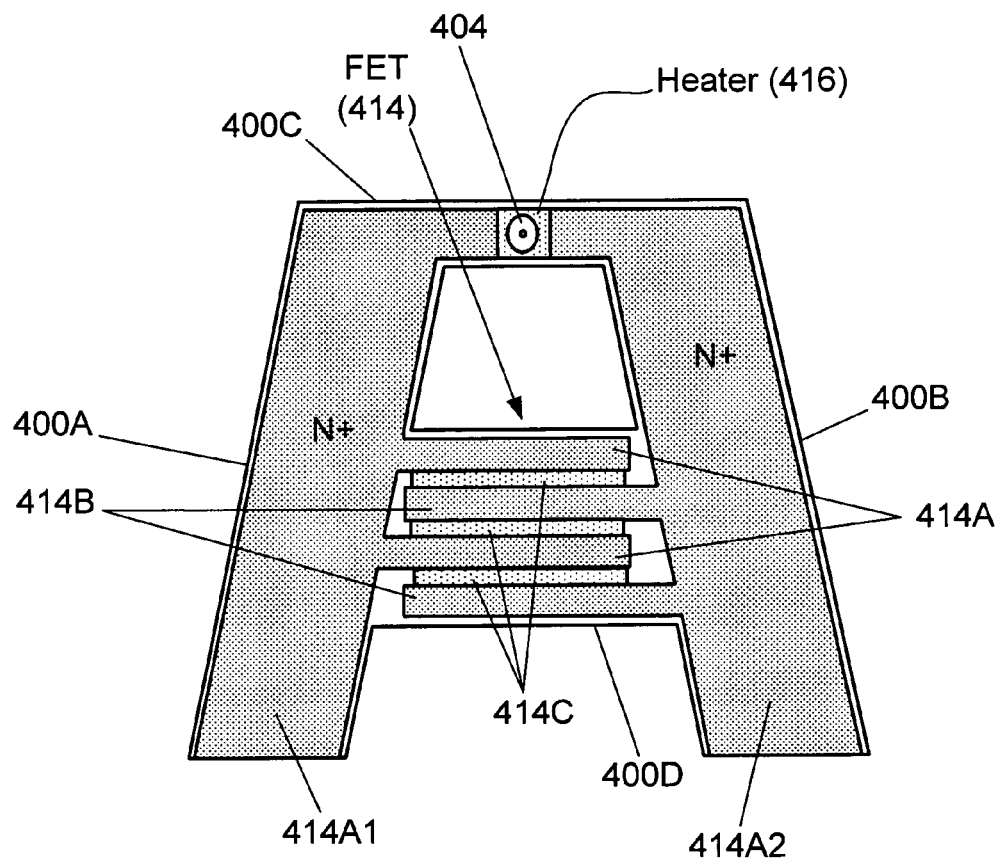
FIG. 6 is an schematic underside plan view of the cantilever showing a heater/FET arrangement according to a fourth embodiment of the invention.

FIG. 6 shows a fourth embodiment of the invention. In this embodiment the cantilever 400 includes two bridge portions 400C and 400D. The second bridge portion 400D is formed inboard of the end bridge on which the probe and heater are formed. The FET 414 is formed on the second bridge and thus isolated from the heater 416. The FET 414 is formed so as to have interdigitized source and drain portions 414S, 414D with channels 414C interposed therebetween in the illustrated manner. This interdigitzing or interlacing of the FET source and drain structures provides a higher W/L ratio and thus improves performance. This embodiment of course requires the structure of the cantilever to be modified. However, this modification is readily achieved using conventional etching techniques and as such no further disclosure of this is deemed necessary.

Figure 7:
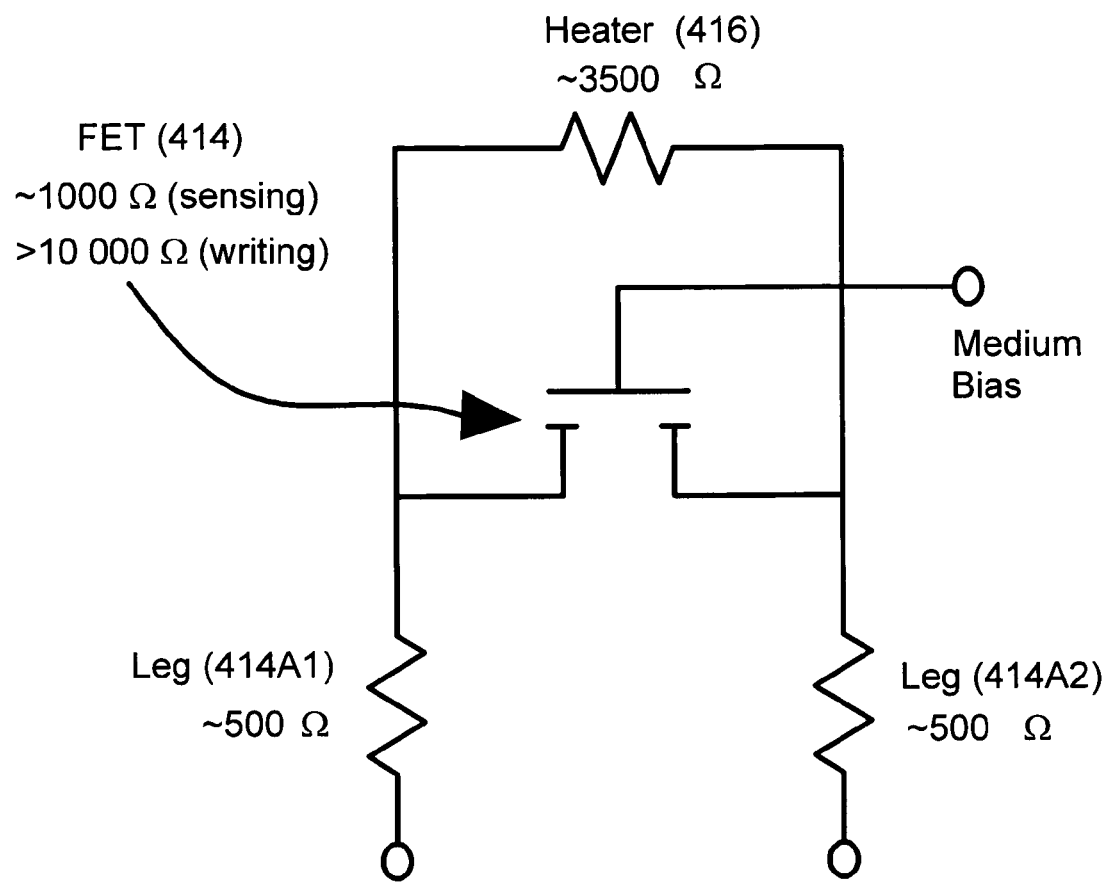
FIG. 7 is circuit diagram showing the basic connection between the heater and the FET which is used in the embodiments of the invention.

FIG. 7 shows, in circuit diagram form, the arrangement which is established in FIG. 6. As will be appreciated from this diagram, the bias which is applied to the substrate 110 gates the FET structure 414 which is formed in the second bridge portion 400D of the cantilever 400. During the writing phase, the bias applied to the substrate 110 can be adjusted to a level where the FET 414 is rendered non-conductive and exhibits (by way of example) a resistance of more than 10,000Ω. This enables sufficient current to be supplied to the heater 416 via the legs 414A1 and 414A2, to elevate the temperature of the portion of the cantilever surrounding (and/or including) the probe 404, sufficiently to fuse and modify the topography of the medium 108 should the probe be induced to press down against the surface of the medium 108.

Conversely, during the sensing phase, the bias to the substrate 110 is elevated to level wherein the FET can be gated and thus rendered conductive (thus exhibiting a resistance of 1000Ω for example). During this time, the high resistance of the heater (e.g. about 3500Ω) effectively directs a majority of the current flow through the FET 414 and the temperature of the heater falls to essentially ambient levels.

Although the invention has been disclosed with reference to a limited number of embodiments, the various modifications and variations which can be made without departing from the scope of the invention, which is limited only by the appended claims, will be self-evident to those skilled in the art of Atomic Resolution Storage (ARS) and Contact Probe Storage (CPS) technology. For example, while the second—fourth embodiments shown in FIGS. 4-6, are shown using depletion mode FETs, they may be adapted to be induced-channel or enhancement mode FETs.

What is claimed is:

1. A read/write arrangement comprising:
   a cantilever disposed with a medium that is supported on an electrically conductive substrate and that is movable relative to the cantilever;
   a device included in the cantilever and being responsive to changes in an electrical field that is generated between the electrically conductive substrate of the medium and the cantilever caused by a change in distance between the medium and the cantilever;
   a heater disposed on the cantilever for heating the medium and for inducing localized topographical changes which represent bits of data; and
   a circuit that electrically interconnects both of the device and the heater and that responds to changes in current through the device caused by changes in the electrical field.

2. A read/write arrangement as set forth in claim 1, wherein the circuit forms at least a part of the device.

3. A read/write arrangement as set forth in claim 1, wherein the circuit has portions which are common to both the device and the heater.

4. A read/write arrangement as set forth in claim 1, wherein the cantilever comprises a probe which extends from the cantilever and which is configured to be contactable with a surface of the medium and to respond to a topography of the medium to cause the distance between the cantilever and the medium to vary.

5. A read/write arrangement as set forth in claim 1, wherein the medium is electrically non-conductive and is formed over the electrically conductive substrate.

6. A read/write arrangement as set forth in claim 1, wherein the device is a FET (Field Effect Transistor).

7. A read/write arrangement as set forth in claim 6, wherein the circuit comprises a plurality of electrically conductive traces which are formed in the cantilever and which comprise a source and a drain of the FET and wherein the source or drain of the FET forms part of a circuit which supplies electrical current to the heater.

8. A read/write arrangement as set forth in claim 7, wherein the plurality of electrically conductive traces further comprise a channel interposed between the source and the drain of the FET.

9. A read/write arrangement as set forth in claim 7, wherein the cantilever is made of silicon and the electrically conductive traces are formed by doping the silicon to render selected regions electrically conductive.

10. A read/write arrangement as set forth in claim 7, wherein the heater comprises a doped region having an electrical resistance which is higher than the traces.

11. A read/write arrangement as set forth in claim 9, wherein the cantilever has a pair of arms which are interconnected by a bridge member, wherein the probe is formed on the bridge member, wherein the heater is formed on the bridge member and wherein the doped traces are formed on both arms.

12. A read/write arrangement as set forth in claim 6, wherein the FET is configured to function as the heater.

* * * * *